Sept. 22, 1936.  A. HOFMANN  2,055,198
CHUCK ASSEMBLY
Original Filed June 20, 1934   2 Sheets-Sheet 1
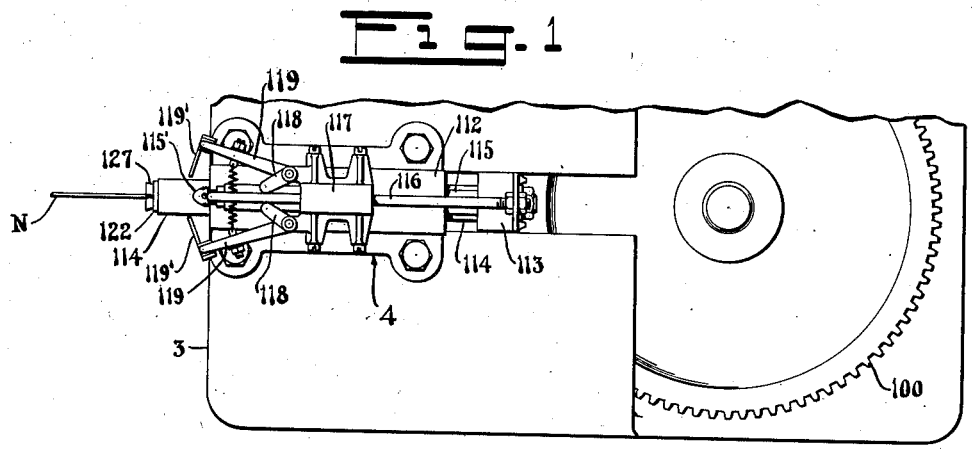
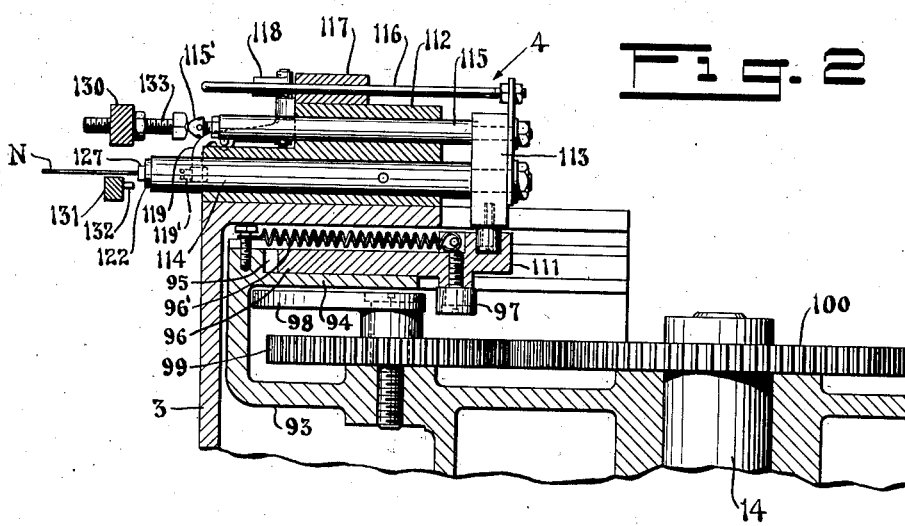
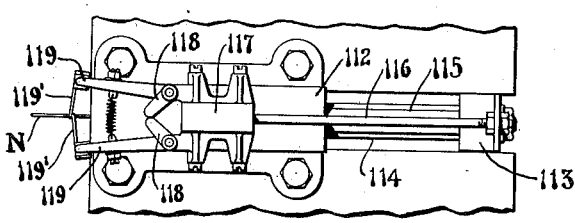
INVENTOR.
Alfred Hofmann
BY
ATTORNEYS Sept. 22, 1936. A. HOFMANN 2,055,198
CHUCK ASSEMBLY
Original Filed June 20, 1934 2 Sheets-Sheet 2
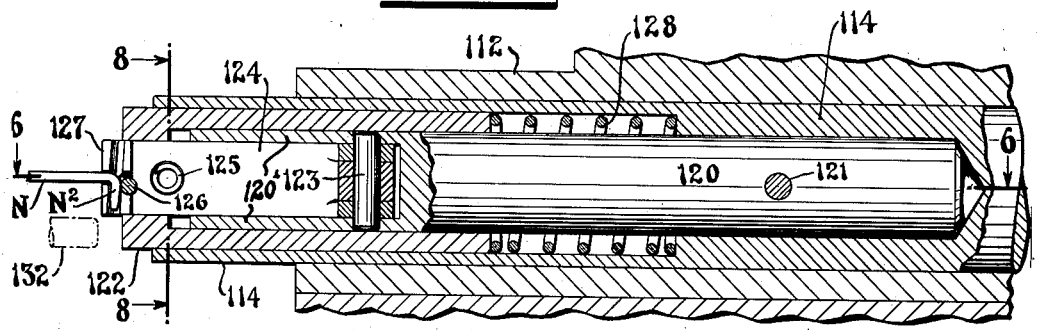
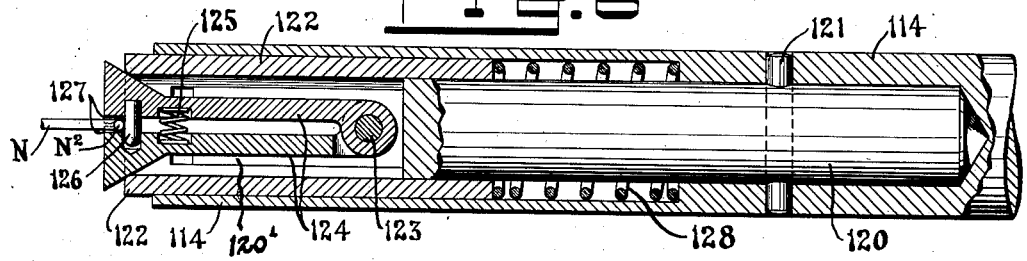
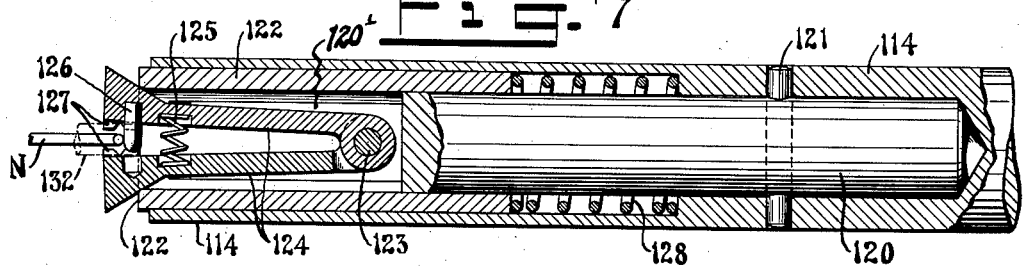
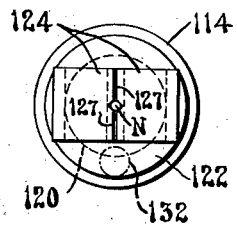 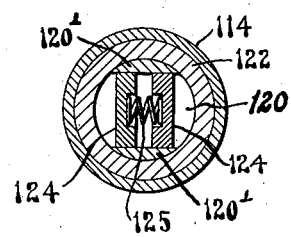 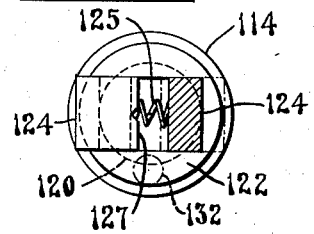
INVENTOR.
Alfred Hofmann
BY
Darby & Darby
ATTORNEYS Patented Sept. 22, 1936

2,055,198

UNITED STATES PATENT OFFICE 2,055,198

CHUCK ASSEMBLY

Alfred Hofmann, Palisade, N. J., assignor to Alfred Hofmann Needle Works, Inc., Union City, N. J., a corporation of New Jersey Original application June 20, 1934, Serial No. 731,440. Divided and this application March 2, 1935, Serial No. 9,030

3 Claims. (Cl. 163—4)

This invention relates to improvements in chuck assemblies of the type particularly adaptable for use in automatic machinery and the like for the purpose of holding work pieces in position to be operated upon.

An important object of this invention is to provide a reciprocally mounted chuck assembly arranged to automatically open to receive a work piece.

A further object of this invention is to provide a supporting arrangement to grip the work at a point spaced from the chuck so as to steady it during the processing of the work piece.

These and other objects as will appear from the following disclosure are secured by means of this invention.

This invention resides substantially in the combination, construction, arrangement, relative location of parts, all as will be set forth in full detail in the following specification in connection with the attached drawings, and pointed out in the appended claims.

This application is a division of my copending application Serial No. 731,440, filed June 20, 1934, which has become Patent No. 2,041,547, issued May 19, 1936 for "Method and machine for making knitting needles".

In the drawings,—

Fig. 1 is a top plan view with some parts broken away of a chuck assembly in accordance with this invention;

Fig. 2 is a vertical central longitudinal cross sectional view of the device;

Fig. 3 is a detail plan view showing the parts in a different position from that of Fig. 1;

Fig. 4 is a longitudinal vertical cross sectional view through the chuck itself;

Fig. 5 is an end elevational view of the chuck jaws;

Fig. 6 is a cross sectional view taken on the line 6—6 of Fig. 4;

Fig. 7 is a similar view with the parts positioned so that the chuck jaws are open;

Fig. 8 is a cross sectional view taken on the line 8—8 of Fig. 4; and

Fig. 9 is a front elevational view of the chuck jaws in open position, showing one of the jaws in cross section.

The mechanism herein disclosed forms a part of an automatic machine for manufacturing spring beard knitting needles from wire stock. The complete assembly is disclosed in my above mentioned copending application. Only so much of the operating mechanism is herein disclosed to show an operative arrangement.

The chuck assembly of this application is of general application and is illustrated as mounted upon a fixed support, although in the parent application a plurality of such chuck assemblies are mounted upon a rotatable turret, so as to carry work pieces held in the chuck to successively arranged attachments for performing successive operations upon the work piece.

As shown in the drawings the device comprises any suitable type of support 3 for the chuck assembly which, as mentioned above, but not herein shown, may be a movable support, as for example a rotary turret. Mounted upon the support is the chuck assembly which is indicated generally by the reference numeral 4. Mounted within the support 3 is another support 93, in which is journaled a power driven shaft 14, keyed to the driving gear 100. This gear meshes with a driven gear 99 which is secured to, for rotation with, a cam 98. Formed in the support 93 is a guideway 95 in which a slide 96 is mounted. This slide is provided with a cam follower 97 shown in the form of a roller positioned to be engaged by the cam 98. A spring 96' interconnects the slidable member 96 with the support so as to urge the cam follower 97 into contact with the cam 98.

Mounted upon the support 3 is a housing 112 for slidably supporting the chuck which is generally indicated at 114. Also slidably mounted in the housing 112 is a rod 115 which is united with the chuck by means of a plate 113. This plate is provided with a pin or roller which fits into a recess in an extension 111 on the slide 96. Thus movement of the slide causes movement of the chuck assembly and the parts connected therewith through the plate 113. Also mounted on an extension of plate 113 or an arm secured thereto, as shown, is a bar 116 which is guided in the member 117 mounted on the housing 112. Pivotally supported on the member 117 are a pair of bell crank levers having the short arms 118 and the long arms 119 which terminate in the fingers 119'. These fingers are interconnected by means of a spring, as shown in Fig. 1, so as to normally urge them together. The short arms 118 are positioned so that the rod 116 may pass therethrough.

The construction of the chuck is clearly shown in Figs. 4 to 9 inclusive. It comprises the rod 114 which is counterbored from one end to provide a chamber which has an axial extension of smaller diameter. Mounted within this extension is a solid rod 120 which is secured in place by means of the transverse pin 121. At 122 is a tubular sleeve which is slidably mounted in the counterbore of the rod 114, and positioned so as to telescope with the free end of the rod 120. A coil spring 128 is seated in the bottom of the recess and mounted between this terminal end and the sleeve 122, so as to surround the rod 120. The end of rod 120 is slotted to form a pair of extending arms 120' which have inner flat sides as is apparent from Fig. 8. These extensions are positioned to ride in the sleeve 122, as is clear from Figs. 6 and 7. Pivotally mounted on the extensions 120' by means of a pivot pin 123, are the chuck jaws 124. Interposed between these jaws so as to normally urge them apart is a coil spring 125. Mounted on one of the jaws is a pin 126 positioned to register with an aperture in another jaw when the jaws are in closed position. A pair of work gripping anvils 127 are formed by milling slots on the inner faces of the jaws 124 in opposed relation so as to grip the work piece N. The particular work piece illustrated is provided with a bent end as shown at N², Fig. 4, and the pin 126 is also positioned so as to aid in properly positioning the work piece in the notches of the anvils.

As illustrated in Fig. 2, there is provided a fixed support 130 upon which a longitudinally adjustable index or stop pin screw 133 is mounted. The screw 133 is positioned so as to engage the head 115' which is longitudinally adjustable upon the rod 115. At 131 is either a fixed or movable support upon which is mounted a pin 132, positioned so as to engage the end of sleeve 122, as will be apparent from Figs. 4, 5 and 9.

In the operation of this device with shaft 14 revolving it will be apparent that cam 98 revolves. When it is in the position shown in Fig. 2, the slide 96 is to the left hand position as is the chuck 114, and all parts connected thereto. In this position rod 116 has spread the arms 119 so that the fingers 119' are disengaged from the work piece. The head 115' of the rod 115 has engaged the stop screw 133 so that the parts may move no further to the left. Support 131 is then moved (preferably by automatic mechanism not shown) towards the chuck so that the pin 132 engages the sleeve 122 and moves it inwardly against the action of spring 128. As the sleeve moves inwardly its end which engages the outer inclined faces of the chuck jaws 124 moves back so that the jaws may separate under the action of spring 125. Fig. 7 shows the jaws fully opened. The work piece may then be removed from the chuck manually or by means of automatic mechanism. A new work piece is inserted in place, as indicated in Fig. 4. The support 131 with its pin 132 then moves away from the chuck with the result that spring 128 moves the sleeve 122 outwardly. The end of the sleeve engaging the inclined faces of the chuck jaws causes them to move together gripping the work piece N and compressing spring 125. By this time cam 98 will have moved to a position so as to engage cam follower 97 and move it to the right. This causes slide 96 to move to the right, tensioning spring 96' and moving all of the parts including chuck 114, plate 113 and rods 115 and 116 to the right. As this movement continues rod 116 moves from between the short arms 118 so that the fingers 119' engage and support the work piece N. The work piece N may then be processed.

Thus, in the case of the parent application the support 3, which is in the form of a turret, is moved in a step-by-step movement from one attachment to another, where the work piece is operated upon.

From the above description it will be apparent that this invention resides in certain principles of construction and operation which may be embodied in other physical forms without departure from the scope of the invention. I do not, therefore, desire to be strictly limited to the disclosure as given for purposes of illustration, but rather to the scope of the appended claims.

What I seek to secure by United States Letters Patent is:

1. In a mechanism of the type described the combination with a support and an operating mechanism, of a chuck device slidably mounted on the support and having gripping jaws and interconnected with the operating mechanism whereby the chuck may be reciprocated in the support, a work supporting means comprising a pair of pivotally mounted arms having fingers thereon positioned to engage the work piece at a point beyond the chuck jaws, and means operated by the movement of the chuck for engaging and disengaging the fingers with and from the work piece.

2. In a mechanism of the type described, the combination comprising a support, a chuck slidably mounted on the support and having work gripping jaws, means for effecting sliding movement of the chuck, a pair of work gripping fingers pivotally mounted on the support and having levers secured thereto, and means mounted on the chuck for movement therewith for engaging said levers to open and close said fingers whereby work held in the chuck may be engaged and supported at a point in front of the chuck jaws.

3. In a mechanism as described the combination with a support and a power operated mechanism, of a chuck having jaws slidably mounted in the support and interconnected with the power operated mechanism, means for connecting the chuck to release its jaws as it approaches the end of its movement in one direction, a pair of pivotally mounted work supporting members positioned on the chuck body and closable by movement of the members into a position in front of the chuck jaws, and means for opening and closing said members operated by the reciprocation of the chuck.

ALFRED HOFMANN.